(12) United States Patent
Trehan

(10) Patent No.: US 9,414,295 B2
(45) Date of Patent: Aug. 9, 2016

(54) SYSTEMS AND METHODS FOR WIRELESS COMMUNICATION IN RETAIL MEDIA

(71) Applicant: Smoothweb Technologies Limited, Hong Kong (HK)

(72) Inventor: Rajiv Trehan, Tokyo (JP)

( * ) Notice: Subject to any disclaimer, the term of this patent is extended or adjusted under 35 U.S.C. 154(b) by 70 days.

(21) Appl. No.: 14/261,382

(22) Filed: Apr. 24, 2014

(65) Prior Publication Data

US 2015/0312839 A1    Oct. 29, 2015

(51) Int. Cl.
| | |
|---|---|
| H04W 8/22 | (2009.01) |
| H04W 40/24 | (2009.01) |
| H04W 76/02 | (2009.01) |
| H04W 8/00 | (2009.01) |
| H04W 84/20 | (2009.01) |

(52) U.S. Cl.
CPC .......... *H04W 40/244* (2013.01); *H04W 76/023* (2013.01); *H04W 8/005* (2013.01); *H04W 84/20* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 8,370,753 B2 | 2/2013 | Bannister et al. | |
| 8,467,770 B1 | 6/2013 | Ben | |
| 2008/0119243 A1* | 5/2008 | Matsumoto et al. | 455/574 |
| 2008/0311957 A1* | 12/2008 | Jantunen et al. | 455/560 |
| 2009/0046633 A1 | 2/2009 | Thomson | |
| 2011/0047230 A1* | 2/2011 | McGee | 709/206 |
| 2013/0178163 A1 | 7/2013 | Wang | |
| 2013/0329888 A1 | 12/2013 | Alrabady | |

FOREIGN PATENT DOCUMENTS

WO    2013187870    12/2013

* cited by examiner

*Primary Examiner* — Chi H Pham
*Assistant Examiner* — Shick Hom
(74) *Attorney, Agent, or Firm* — Matt Catlett

(57) ABSTRACT

The present invention relates to systems and methods for facilitating a Wireless Communication and management system comprising Wireless Activation Module installed on a Wireless Activation Device configured to operatively communicate with one or more Antennas to receive one or more information from a Wireless Transceiver Product, wherein a beacon is embedded to broadcast signals in regular intervals. The Wireless Activation Module is a process, plug-in, extension, script, application or driver that detects, monitors and tracks beacons and translates that activity into signals that can be used to activate and target multi-dimensional content (media, scenes, layers or other structured content) in response to the beacon activity.

6 Claims, 5 Drawing Sheets

| # | State | Description |
|---|---|---|
| | BEACON_OUT_OF_RANGE | The beacon is not within range of the antenna. |
| | BEACON_MONITORING | The beacon is within range of antenna and the Wireless Activation module on wireless Activation device is monitoring the beacon. |
| | BEACON_MONITORING_CONTROLLING | The Wireless Activation is monitoring the beacon and the beacon has crossed its gain threshold. The Wireless Activation is either<br>• directing and controlling the activation of multi-dimensional content on one or more the target devices;<br>or<br>• is communicating this information to one or more external resources so they can direct and control the activation of multi-dimensional content on one or more target devices. |
| | | |

FIG.3

| # | Item | Notes |
|---|---|---|
| | width | Total width of the Activation display area. |
| | height | Total height of the Activation display area. |
| | back ground | Background of the Activation display. |
| | alpha | Total alpha of the Activation display area. |
| | text_box | Location and Size of the text box to display Activation associated text (e.g. "0,50,400,200") if applicable. |
| | debug | Determines if debugging information should be logged |
| | text_front | Font of Activation associated text when displayed in media board (e.g. "_sans"), if applicable. |
| | ip_addr | ip_addr="192.168.1.18". |
| | port | port="23432" |
| | proximity_signals | The number of signals the Wireless Activation utilises when determining the direction a beacon is travelling. |
| The Wireless Activation needs to know which beacons it is monitoring so there is a <Wireless> element for each beacon being monitored. | | |
| | beacon_id | The identifier which uniquely identifies a beacon (e.g. MAC address). If the beacon is attached to a pair of Type A Sandals , the target needs to reflect the scene identifier in the media board associated with Type A Sandals. This is the scene that we will transition to. |
| | target | identifies the related content associated with the Wireless enabled product in the multi-dimensional content; |
| | gain | Represents the proximity threshold in metres for the beacon that triggers an action by the Wireless Activation e.g. ble_gain="15". |
| | direction | determines when to trigger action in the Wireless Activation i.e. coming closer or getting further away from the antenna; Valid values ["nearer","farther"]; |
| | order | determines the importance of the beacon and is used in determining how the Wireless Activation interacts with the multi-dimensional content. Valid Values are integer values with 1 being the most important; |
| | type | type of beacon; |

FIG. 4A

```
XML - Wireless Activation
<data ip_addr="192.168.1.18" port="23432" width="400" height="300" text_box="0,50,400,200" background="0x000000"
alpha="20" debug="false" text_font="_sans" beacon_type = "1" >
<beacon beacon_id="CC:D5:6F:F3:8A:C0" target="shoeTypeA" beacon_gain="15" direction=" farther" order="1" type="shoe" />
<beacon beacon_id="F4:F8:4B:FB:3B:EF" target="shoeTypeB" beacon_gain="15" direction=" farther" order="2" type="shoe" />
<beacon beacon_id="F7:1C:38:BC:51:F1" target="shoeTypeC" beacon_gain="15" direction=" farther" order="2" type="shoe" />
<beacon beacon_id="E3:A7:8A:D1:F4:8A" target="sandalTypeA" beacon_gain="15" direction=" farther" order="2" type="sandal" />
<beacon beacon_id="C4:BE:3C:1D:87:1A" target="sandalTypeB" beacon_gain="15" direction=" farther" order="2" type="sandal" />
<beacon beacon_id="DD:D0:A1:C9:3C:0B" target="sandalTypeC" beacon_gain="15" direction=" farther" order="1" type="sandal"/>
</data>
```

FIG. 4B

SYSTEMS AND METHODS FOR WIRELESS COMMUNICATION IN RETAIL MEDIA

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014, SmoothWeb.

BACKGROUND OF THE INVENTION

1. Technical Field

The present invention relates to the field of Wireless Communication. More particularly, relates to systems and methods for Wireless Communication between one or more electronic devices facilitating communication and interaction between products and Wireless Communication device.

2. Description of the Related Art

Wireless Communication is the transfer of information between two or more points that are not connected by an electrical conductor. The most common wireless technologies use radio. With radio waves distances can be short, such as one or more meters for television or as far as thousands or even millions of kilometers for deep-space radio communications. It encompasses various types of fixed, mobile, and portable applications, including two-way radios, cellular telephones, personal digital assistants (PDAs), and wireless networking. Other examples of applications of radio wireless technology include GPS units, garage door openers, wireless computer mice, keyboards and headsets, headphones, radio receivers, satellite television, broadcast television and cordless telephones.

Bluetooth™ (hereinafter "BT") wireless technology is a short-range communications system utilized to wirelessly link portable and/or fixed electronic devices, such that cables and wires that would normally connect theses devices are not needed. Presently, there are two forms of BT wireless technology systems. One form of BT is the Basic Rate (BR) system, which is also referred to as classic Bluetooth, since this system has been in existence for some time and currently implemented in wirelessly connecting devices. The second form is a newer implementation of BT, known as Low Energy (LE) BT or Bluetooth Low Energy (BLE). Both systems include device discovery, connection establishment and connection mechanisms.

The Basic Rate system includes optional Enhanced Data Rate (EDR) Alternate Media Access Control (MAC) and Physical (PHY) layer extensions. The Basic Rate system offers synchronous and asynchronous connections with data rates of 721.2 Kbps for Basic Rate, 2.1 Mbps for Enhanced Data Rate and high speed operation up to 24 Mbps with the IEEE 802.11 AMP (Alternate MAC PHY) systems. The BLE system includes features designed to enable products that require lower current consumption, lower complexity and lower cost than classic BT using BR/EDR. The BLE system is intended to consume a fraction of the power required for classic BT and a device powered by a button cell battery may power BLE communications for an extended period from the battery. A number of different applications are envisioned for BLE, including medical monitoring and transmission of the monitored data by a wireless link.

In the BT 4.0 specification for BLE operation, there are five states that a BLE device may be in; of which one is a standby state. In this specification, the BLE scanning and initiation states are specified as two independent and completely separate activities (states). A BLE device which is compliant to the BT 4.0 specification standard does either scanning or initiation. The scanning state is entered to scan for advertisers on a BLE network, while the initiation state is entered to initiate a connection request. Accordingly, in order to perform both functions of scanning and initiating, a BLE device needs to open a receive window a minimum of two times (one receive window for scanning and one receive window for initiating).

When the receive window is open on a device, the device is in a receiving mode for BLE and the radio frequency (RF) front end of the device, as well as the antenna, may be occupied strictly with the receiving function. This implies that during these two receive periods for scanning and initiating; the device is not available for other activities. Opening two receive windows may consume more power than opening a single receive window. More importantly, when the antenna and/or the RF front end is occupied for such receiving times, the radio portion of the device is not able to do other functions due to the multiplexed timing scheme used in BT. This result may reduce the bandwidth efficiency of the device. The problem may compounded when the device has other Wireless Communication capabilities that it needs to address, such as classic BT, wireless local area network (WLAN) and/or cellular communication (e.g. long term evolution, commonly known as LTE).

It would be advantageous to combine the operations of scanning and initiating into a single receive window opening for a BLE device. Since there is no prohibition in the BT 4.0 specification to use just one receive window, there is no reason why the BLE device could not send out a connection request (initiation) while the device is scanning for advertisers. If the received advertiser address is one that the device wants to make a connection, the BLE device could always send out a connection request, instead of a scan request. This allows only one receive window to be needed to make a BLE connection, instead of two receive windows, yet remain compliant with the BT 4.0 standard. A number of advantages may be obtained with concurrent scanning and initiation, including saving bandwidth and/or reducing power consumption.

Near Field Communication (NFC) is a technique that helps devices establishes radio communication by bringing the devices into close proximity. NFC facilitates various applications such as contactless transactions, data exchange, Radio Frequency Identification (RFID) tag scanning, mobile payments, and so on. Further, NFC enabled handsets can be used to view real time travel information and to purchase transport tickets. Further, the NFC communication is based on RFID standards. Mobile devices are equipped with NFC chips that are capable of sending encrypted data over a small distance. An NFC system normally has an initiator and a target. The initiator generates a Radio Frequency (RF) field that triggers the passive target. The NFC targets normally take the form of tags, stickers, cards, etc. that can store information and do not require a battery to operate.

Radio-frequency identification (RFID) is a wireless non-contact use of radio-frequency electromagnetic fields to transfer data, for the purposes of automatically identifying and tracking tags attached to objects. The tags contain electronically stored information. Some tags are powered by and read at short ranges (a few meters) via magnetic fields (electromagnetic induction). Others use a local power source such as a battery, or else have no battery but collect energy from the interrogating EM field, and then act as a passive transponder to emit microwaves or UHF radio waves (i.e., electromagnetic radiation at high frequencies). Battery powered tags may operate at hundreds of meters. Unlike a bar code, the tag does not necessarily need to be within line of sight of the reader, and may be embedded in the tracked object. Activation Target Device is a form of electronic display that shows television programming, menus, information, advertising and other messages. Activation Target Devices (frequently utilizing technologies such as LCD, LED, plasma displays, or projected images to display content) can be found in both public and private environments, including retail stores, hotels, restaurants, and corporate buildings, amongst other locations.

Activation Target Device systems and networks make use of display screens that are controlled to present different manners of content. Often these systems display advertising materials, and are part of a network of displays on which an advertiser can buy display time. The displays are often controlled by computer systems and are presented to a viewer in such a fashion that it appears that the screen is an autonomous device. Activation Target Device is used for a number of other purposes including corporate displays used to provide information and direction to users, industrial displays used to display real time production data, conference displays used to display upcoming meetings, airport displays that provide incoming flight information as well as numerous other uses known to those skilled in the art.

The three most popular types of Activation Target Device are outdoor, indoor and mobile. Although there are more types of Activation Target Devices, these are the ones most commonly used. Outdoor Activation Target Device is where a media player and LCD screen is installed outdoors in order to display specific information. Outdoor Activation Target Device is typically used in public areas. The screens are usually placed in a waterproof enclosure to ensure no damage occurs.

Indoor Activation Target Device is usually found in places like hotels, movie theaters and malls. One type of indoor Activation Target Device is a digital poster. These are one of the most cost effective methods of Activation Target Device. Indoor Activation Target Device is great for places like hair salons, restaurants and such. Indoor Activation Target Device is usually displayed by an LCD screen and the content is typically put out by a media player.

Mobile Activation Target Device is a new, but quickly growing method. More and more businesses are turning to this method of Activation Target Devices to get their message across. This method is commonly used to promote a certain service or product. You will usually find mobile digital on vehicles such as taxi cabs and city buses. This is a great way to send out a message to locals as well visitors. There is also a new method of Mobile Activation Target Devices that allows the screens to be placed on people. These are called signage vests. They are simply vests with the screens installed onto them. This allows someone to wear them and walk around to reach a targeted audience.

Activation Target Device displays is most commonly controlled by personal computers or servers, through the use of either proprietary software or free software; this approach often allows the operator to avoid large capital outlays for the controller equipment.

Advertising using an Activation Target Device is a form of out-of-home advertising in which video content, advertisements, and/or messages may be displayed on Activation Target Devices with a common goal of delivering targeted messages, to specific locations and/or consumers, at specific times. This is often called "digital out of home" or abbreviated as DOOH.

Since Activation Target Device content may be both frequently and easily updated, saving the printing and/or construction costs associated with a static sign, and also because of the interactive abilities available through the accompanying employment of such real-world interfaces as embedded touch screens, movement detection and image capture devices, it has won wide acceptance in the marketplace.

Currently, companies/organizations/retailers do not have the capability of allowing their Digital Signs react when a BLE beacon comes in near proximity. Retailers are investing in Touch Digital Signage which allows their customers to interact with the information available on the Digital Sign. However, the customer will have to search for specific product information if it is available on the Digital Sign. Retailers would like to allow their customers to pick up a product and carry that product to a digital sign once the sign detects the product if automatically displays related information and the user can carry on the interaction.

Although, there have been many application or program for Wireless Communication and Activation Target Devices systems per se, however a combination of such applications configured to receive data/information from one or more product via Wireless Communication beacons and further establish interaction with Activation Target Devices using Bluetooth Low Energy (BLE) wireless transceivers and other transceiver technologies that have the ability to be tracked at a distance is not available. The existing systems are specifically not designed for users to interact the Activation Target Devices with these transceiver technology enabled devices.

Hence, there is a need for a advanced system and method for users to fulfill all their needs including but not limited to details comprising Advertisements, Public information, Internal information, Menu information, Brand building, Influencing customer behavior, Enhancing customer experience, Enhancing the environment amongst many others.

The present invention provides a system and method to overcome the above technical shortcomings by providing a simple, easy to use system for one or more user to provide information using the Activation Target Device which is coupled to the application or program.

SUMMARY OF THE INVENTION

The present invention provides Methods and Systems for Wireless Communication comprising Wireless Activation module installed on a Wireless Activation Device configured to operatively communicate with one or more Antennas to receive one or more information from a Wireless Transceiver Product, wherein a beacon is embedded to broadcast signals in regular intervals. Where the Wireless Activation module is a process, plug-in, extension, script, application or driver that detects, monitors and tracks beacons and translates that activity into signals that can be used to activate and target multi-dimensional content in response to beacon activity and other factors such as external events, current state of multi-dimensional content and date-time. The multi-dimensional content targeted by Wireless Activation module may be on the Wireless Activation Device or may be external to the Wireless Activation Device. The wireless Activation Module is loaded and configured on the wireless Activation Device where it captures signals from multiple beacons via antenna.

The wireless Activation module is configured to monitor, store and communicate information pertaining to both recognised and unrecognised wireless beacons; manage multi-dimensional contents on multiple activation-target devices. It is important to note that the same signal may trigger different activity on different activation-target devices because of the configuration for that activation device, the current state of the device or external events.

The wireless Activation Module is configured with information about each beacon it is required to monitor. This information helps to determine how the Wireless Activation Module interacts with the relevant multi-dimensional content on one or more activation target devices.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 3 illustrates an exemplary tabular representation in accordance with an embodiment of the present invention.

FIG. 4A illustrates an exemplary tabular representation in accordance with an embodiment of the present invention.

FIG. 4B illustrates an exemplary tabular representation in accordance with an embodiment of the present invention.

DETAILED DESCRIPTION

Figure 1:
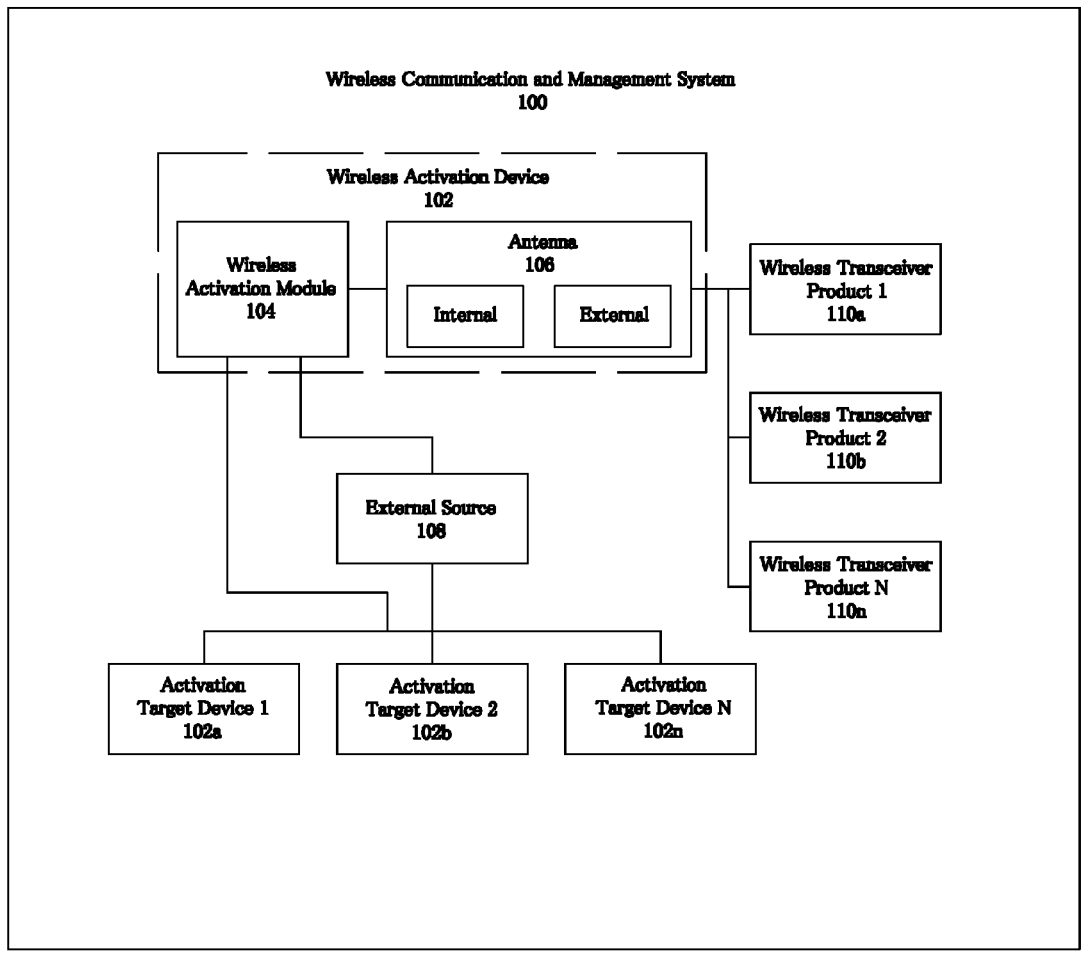
FIG. 1 illustrates an exemplary modular representation in accordance with an embodiment of the present invention.

The present invention provides a Method and System for Wireless Communication comprising; Wireless Activation module installed on a Wireless Activation Device configured to operatively communicate with one or more Antennas to receive one or more information from a Wireless Transceiver Product, wherein a beacon is embedded to broadcast signals in regular intervals. The Wireless Activation module is a process, plug-in, extension, script, application or driver that detects, monitors and tracks beacons and translates that activity into signals that can be used to activate and target multi-dimensional content in response to the beacon activity and other factors such as external events, current state of multi-dimensional content and date-time. The multi-dimensional content targeted by Wireless Activation Module may be on the Wireless Activation Device or may be external to the Wireless Activation Device. The wireless Activation module is loaded and configured on the Wireless Activation Device where it captures signals from multiple beacons via antenna.

The wireless Activation module is configured to monitor, store and communicate information pertaining to both recognised and unrecognised wireless beacons; manage multi-dimensional content on multiple activation-target devices and/or communicate this information to external resources. It is important to note that the same signal may trigger different activity on different activation-target devices.

The wireless Activation module is configured with information about each beacon required to monitor. This information helps to determine how the Wireless Activation Module interacts with the relevant multi-dimensional content on one or more Activation Target Devices.

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or in groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

TERMINOLOGY

Brief definitions of terms used throughout this application are given below.

The term "Wireless Transceiver Technology" primarily refers to Bluetooth Low Energy (BLE) but can also refer to current and future transceiver technologies that have the ability to be tracked at low to medium distances (i.e. 0-50 meters) such as Near Field Communication (NFC), Radio Frequency Identity (RFID).

The term "BLE" generally refers to Bluetooth low energy, Bluetooth LE, or BLE, marketed as Bluetooth Smart, is a wireless personal area network technology designed and marketed by the Bluetooth Special Interest Group. BLE is intended to provide considerably reduced power consumption and cost while maintaining a similar communication range to 'classic' Bluetooth.

The term "NFC" generally refers to Near Field Communication, which is a technique that helps one or more devices establish radio communication by bringing the devices into close proximity.

The term "RFID" generally refers to Radio Frequency Identification, which is a wireless non-contact use of radio-frequency electromagnetic fields to transfer data, for the purposes of automatically identifying and tracking tags attached to objects.

The term "Beacon" generally refers to a wireless transceiver operating in a Beacon mode. The Beacon repeatedly or continually broadcasts small amounts of data including its device identifier allowing the transceiver to be tracked at a distance. Examples of wireless transceivers include Bluetooth Low Energy (BLE) wireless transceivers, Near Field Communication (NFC) transceivers and Radio Frequency Identification (RFID) transceivers.

The term "Antenna" refers to a Wireless Transceiver Technology BLE antenna and others such as Near Field Communication (NFC) antenna, Radio Frequency Identity (RFID) antenna, Wireless Fidelity (Wi-Fi) antenna, Wire Antenna, Log-Periodic Antenna, Aperture Antenna, Travelling Wave Antenna, Reflector Antenna, Microstrip Antenna, NFC Antennas, Fractal Antenna, and Wearable Antenna."

The term "Wireless Transceiver Product" generally refers to a product that has an embedded Beacon.

The term "Wireless Activation Device" generally refers to a device on which Wireless Activation Module is installed.

The term "Wireless Activation Module" generally refers a process, plug-in, extension, script, application or driver that detects monitors and tracks beacons and translates that activity into signals that can be used to activate and target multi-dimensional content (media, scenes, layers or other structured content) in response to the beacon activity.

The term "Multi Dimensional Content" generally refers to contents which are made up of multiple content parts that can be rendered as discrete pieces of information but referenced through its structure. Examples: files in folder using their name, layers in image document using layer number, pages in a file using their page number, frames in a video using time or frame, scenes in a media board by name or scene number, scenes in a digital sign by name or scene number etc.

The term "Activation Target Device" generally refers to a device where the Wireless Activation Module targets to display the Multi-Dimensional content.

In an implementation, the Activation Target Device is the device that Wireless Activation Module targets to display and control the Multi Dimensional Content. The Activation Target Device might be a Digital Sign, a Media Player, a Head Mounted Media Playback Display (Google Glass). The Activation Target Device may also be a social media platform such as Facebook™, Instagram™, Snapchat™, WhatsApp™, LinkedIn™, Twitter™ etc. The Activation Target Device may also be a non-visual target device but not limited to such as Sound Systems (Sound reinforcement system, Hi-Fi, Public Address, Shelf stereo, etc), Lighting Control Systems (Interactive Lighting Systems; Intelligent Lighting Systems; etc) and Security Systems.

In a preferred embodiment of the present invention for Wireless Communication and management comprising: BLE activation referred as Wireless Activation module installed on a Wireless Activation Device configured to operatively communicate with one or more Antennas to receive one or more information from a BLE beacon referred as Wireless Transceiver Product; and direct and control multi-dimensional content on an Activation-Target device and/or passes responsibility to an external resource which can direct and control multi-dimensional content on one or more Activation-Target devices, wherein the BLE activation is a process, plug-in, extension, script, application or driver.

An embodiment of the present invention, FIG. 1 illustrates an exemplary system representation of a Wireless Communication and Management System 100 comprising: Wireless Activation Device 102 installed with Wireless Activation Module 104, where Wireless Activation Module 104 is configured to operatively communicate with one or more Antennas 106 (106a and 106b) to receive one or more information from a Wireless Transceiver Product 112 (112a, 112b, . . . 112n) for information pertaining to both recognised and unrecognised wireless Beacons; and can direct and control multi-dimensional content on one or more Activation Target Devices 110 (110a, 100b . . . 110n) and/or pass that responsibility onto an external resource (108). The external resource (108) can then direct and control multi-dimensional content on one or more Activation-target devices 110 (110a, 100b . . . 110n).

The wireless Activation module (104) is configured with information about each beacon it is required to monitor. This information helps to determine how the wireless Activation module (105) interacts with the relevant multi-dimensional content on one or more Activation Target devices 110 (110a, 100b . . . 110n).

The Wireless Activation Module tracks information of beacon activity and stores it in a data repository for reporting and data analysis. The Activation Target Devices 110 (110a, 100b . . . 110n) can be selected from but not limited to an electronic/computing/communication device, handheld, portable and/or stationary, smart watches, wearable devices, tablet computer, laptop, palmtop, personal computer, touchscreen display, a media player, a head mounted media playback display (Google Glass), mobile telephones, desktop computers, all-in-one computers, notebook computers, ultraportable computers, ultra mobile computers, netbook computers, iPads™, surface tablets, subnotebook computers, personal digital assistants, enterprise digital assistants and mobile internet devices. The Activation Target Device may also be a social media platform selected from but not limited to Facebook™, Twitter™, LinkedIn™, Instagram™, My Space™, Orkut™, Google Plus™, Snapchat™, WhatsApp™, Line™, Skype™, Yahoo chat™, etc.

In another implementation, the Activation Target Device 110 (110a, 100b . . . 110n) can comprise a display, wherein the display can be selected from but not limited to Cathode ray tube display (CRT), Light-emitting diode display (LED), Electroluminescent display (ELD), Electronic paper, E Ink, Plasma display panel (PDP), Liquid crystal display (LCD), High-Performance Addressing display (HPA), Thin-film transistor display (TFT), Organic light-emitting diode display (OLED), Surface-conduction electron-emitter display (SED), Laser TV, Carbon nanotubes, Quantum dot display and Interferometric modulator display (IMOD).

According to another embodiment of the present invention, Wireless Communication and Management System 100 comprises one or more Wireless Transceiver Product 112 (112a, 112b, . . . 112n) is operating in a beacon mode, and broadcasts small amounts of data including its device identifier. The Wireless Transceiver Product 112 (112a, 112b . . . 112n) can be selected from but not limited to a group comprising apparels, clothes, footwears, electronic devices, mechanical devices, communication devices and stationary items.

According to another embodiment of the present invention, the Wireless Communication and Management system 100 comprises a Wireless Activation Device 102 which furthermore, comprises a Wireless Activation Module 104 and an Internal Antenna 106a. An External Antenna 106b can also be operatively coupled to the Wireless Activation Module 104. In an implementation, the internal antenna 106a and External Antenna 106b receive signals transmitted by one or more Beacons which are embedded in one or more Wireless Transceiver Product 112 (112a, 112b . . . 112n). Now, the signal data is furthermore captured from the antennas by the Wireless Activation Module 104 for further identification and processing.

According to another embodiment, the Wireless Communication and Management System 100 also comprise one or more Activation Target Devices 110 (110a, 110b . . . 110n). Advertising using the Activation Target Device 110 (110a, 110b . . . 110n) is a form of out-of-home advertising in which video content, advertisements, and/or messages may be displayed on Activation Target Devices 110 (110a, 110b . . . 110n) with a common goal of delivering targeted messages, to specific locations and/or consumers, at specific times. This is often called "digital out of home" or abbreviated as DOOH. Activation Target Devices 110 (110a, 110b . . . 110n) can also be hereinafter interchangeably called as Digital Sign or Digital Signage System.

The system of the present invention can be programmed to interact with multiple wireless beacons at the same time. For example if a customer approaches the Digital Sign carrying multiple products e.g. two pairs of jeans that the sign can be programmed to schedule two promotional videos simultaneously for play and/or provide the user further activation options of other video for example using touch, gesture or further BLE activation.

For an example, a retailer embeds the wireless Beacon transmitters in specific products throughout the store. The Wireless Activation module is programmed to use beacon information and other factors such as configuration, external events, current state of multi-dimensional content and date-time to control and activate content on the Digital Sign, resulting in the beacon enabled products interacting with the retailer's enabled Digital Sign. The system of the present invention tracks the location of these products in-store and when a customer carries a product towards the Digital Sign and comes within a specified perimeter the Digital Sign transitions to relevant and related content. Similarly, as the product moves away from the board the Digital Sign can transition to more general content.

In another embodiment of the present invention, the System can be implemented in any geographic location. The geographic location indicator may include, but is not limited to, a street address, a business name, GPS coordinates and/or some other location indicator. Type of environment may include, but is not limited to, public transportation entity, restaurant, shopping mall, school and/or other types of environments where an Activation Target Device 110 (110a, 110b . . . 110n) may be located. Public transportation entity may include, but is not limited to, an airport, a train station, a bus station and/or a subway station. Public transportation entities may include one or more movable public transportation components, including but not limited to, rail passenger car(s), bus(es), and/or subway cars. The geographic location indicator associated with a movable public transportation component may include a range of locations corresponding to a route of the movable public transportation component.

Figure 2:
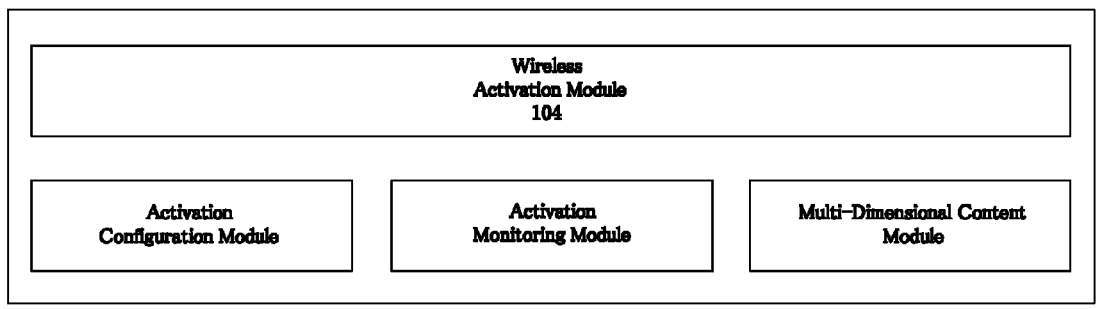
FIG. 2 illustrates an exemplary modular representation of a Wireless Activation Module in accordance with an embodiment of the present invention.

FIG. 2 illustrates an exemplary block representation of a Wireless Activation Module 104 comprising an Activation Configuration Module, an Activation Monitoring Module and a Multi-Dimensional Content Module. The Wireless Activation Module 104 is configured with one or more information from one or more Wireless Transceivers (also called as a Beacon).

In another embodiment of the present invention, The Wireless Activation Module which is installed on a Wireless Activation devices is a process, plug-in, extension, script, application or driver that detects, monitors and tracks beacons. The Wireless Activation Module (104) is programmed to monitor beacons by recognising and tracking beacons, maintaining a count of active beacons, storing monitoring information including a record of previous beacon strengths and history of location. The Wireless Activation Module (104) can utilize its in memory database to determine if a beacon is moving towards or away from an antenna.

In another embodiment of the present invention, the wireless activation module is configured with information about each beacon required to monitor. This information and other factors (such as external events, current state of multi-dimensional content and date-time) helps in determining how the Wireless Activation Module (104) records information and interacts with the relevant Multi Dimensional Content on one or more Activation Target Devices 110 (110a, 110b . . . 100n) and/or passed the information to an external resource (108) so that it can direct and control multi-dimensional content on one or more activation-target devices 110 (110a, 110b . . . 100n).

The Wireless beacon configuration information includes: Beacon Unique Identifier (e.g. MAC Address); Gain—represents the proximity threshold for the beacon that triggers an action by the wireless Activation module; Direction—determines when to trigger action in the wireless Activation modules i.e. coming closer or getting further away from the antenna; Order—determines the importance of the beacon and is used in determining how the Wireless Activation Module activates and directs multi-dimensional content; Type—type of the beacon; Content id—identifies the related content associated with the BLE enabled product in the multi-dimensional content media, is used in determining how the Wireless Activation Module activates and directs multi-dimensional content. All this configuration data along with other factors such as external events, current state of multi-dimensional content and date-time helps in determining how the Wireless Activation Module activates and directs multi-dimensional content.

According to one embodiment of the present invention, the Activation Configuration Module comprises an Identifier Module, a Gain Module, a Direction Module, an Order Module, a Type Module, a Content ID Module and an Unrecognized Wireless Transceiver Module.

The Identifier Module is configured to store the Beacon Unique Identifier of one or more Beacons. Beacons typically use MAC addresses for unique identification. A MAC Address is a Beacon unique identifier assigned to network interfaces for communications on a physical network segment. MAC Addresses are used as a network address for most IEEE 802 network technologies, including Ethernet. Logically, MAC Addresses are used in the media access control protocol sub layer of the OSI reference model.

In an embodiment, MAC addresses are most often assigned by a manufacturer of a Network Interface Controller (NIC) and are stored in its hardware, such as the card's read-only memory or some other firmware mechanism. If assigned by the manufacturer, a MAC Address usually encodes the manufacturer's registered identification number and may be referred to as the Burned-In Address (BIA). It may also be known as an Ethernet Hardware Address (EHA), hardware address or physical address. This can be contrasted to a programmed address, where the host device issues commands to the NIC to use an arbitrary address.

The Gain Module is configured to represent the proximity threshold for one or more Beacons that trigger an action by the Wireless Activation Module.

The Direction Module determines a trigger action in the Wireless Activation Module i.e. as and when it is coming closer or getting further away from an antenna. The antenna receives the signals transmitted by the Beacons. The Wireless Activation module retrieves the Beacon signals from the antenna, wherein the antenna located on the Wireless Activation Device or outside it. The Direction module also uses the beacon signal strength to measure proximity to the antenna and this in turn is utilised to determine the direction the beacon is travelling in relation to the antenna. The Direction module calculates the direction the beacon is travelling by averaging out over a number (configurable) of the last signal strength measurements on the antenna for that beacon.

The Order Module determines the importance of the Beacon and is used in determining how the Wireless Activation Module activates and directs Multi Dimensional Content. The module ranks all the Beacons in order of their importance with regard to a specific user or product.

The Content ID Module identifies the related content associated with the Wireless Transceiver Product in the Multi Dimensional Content media, is used in determining how the Wireless Activation Module activates and directs the Multi Dimensional Content.

The Unrecognized Wireless Transceiver Module can track unrecognized Beacons and can result in generic activations for the same. For instance, the module allows system owners to register the Beacons for future activation, or can activate one or more initial general content. The initial general content can be a Content ID or a Product ID, etc. According to an embodiment of the present invention, the Module comprises at least three Beacon states. These Beacon states are in relation to the Wireless Activation Module. The three Beacon states are Beacon out of Range state, Beacon monitoring state and Beacon Monitoring Controlling state.

FIG. 3 illustrates a tabular representation of various Beacon states such as the Beacon out of Range state, Beacon Monitoring state and Beacon Monitoring Controlling state. The Beacon out of Range state is configured to show that the Beacon is not within the range of the Antenna, wherein the Wireless Activation Module on the Wireless Activation Device cannot monitor the Beacon.

In an embodiment, the Beacon Monitoring state is configured to show that the Beacon is within the range of the Antenna, wherein the Wireless Activation Module on the Wireless Activation Device can monitor the Beacon and show if the Beacon is active or inactive with respect to the Wireless Activation Module. In an embodiment, the Wireless Activation Module can store information about one or more Beacons. It can also perform multiple tasks such as calculating and storing signal strength, signal proximity information, etc.

According to another embodiment of the present invention, the Beacon Monitoring Controlling state is configured to monitor the Beacon in order to check if the Beacon has crossed the threshold of one or more attributes such as Gain threshold, etc. This state is directing and controlling the activation of Multi Dimensional Content on one or more Activation Target Devices. Furthermore, it is communicating this information to one or more external resources so they can direct and control the activation of Multi Dimensional Content on one or more Activation target devices.

According to one embodiment of the present invention, the antenna can be configured to receive Bluetooth Low Energy (BLE) signals and other transceiver technology signals. An another embodiment of the present invention, the Activation Monitoring Module comprising a Recognition Module, a Tracking Module, a Storage Module and a Proximity Module. The Recognition Module is configured to recognise one or more BLE Beacons or other Transceiver Technology beacons. The Beacons can be embedded into one or more products or items in order to implement one or more interactions or transactions or transmission of information to one or more Activation Target Devices.

In another embodiment of the present invention, the Tracking Module is configured to track the location information of one or more Beacons. For instance, if one or more Beacons are within the tracking threshold of an antenna then all location information is tracked by this module.

In yet another embodiment of the present invention, the Storage Module is configured to record and store one or more location information of one or more Beacons by one or more recording means. A record of previous Beacon strengths (history of location) is maintained by the Module, so we can determine if a Beacon is moving towards or away from the Wireless Activation Module. It further maintains a record of the total counts of active Beacons.

In another embodiment of the present invention, the Proximity Module is configured to analyze and tell when one or more Beacons are moving towards or away from one or more Wireless Activation Devices or Activation target devices. For instance, a retailer embeds the Beacon Transceivers in one or more Wireless Transceiver Products throughout a departmental store. The Beacon information is given to one or more Activation Target Module designers and the Monitoring Module is configured in such a way that the Wireless Transceiver Products can interact with the retailer enabled Wireless Activation Module. The Monitoring Module tracks the location of these products in-store and when a customer carries a product towards an antenna (the antenna is installed on the digital sign) and comes within a specified perimeter, the Wireless Activation Module directs and controls the Activation Target Device (i.e. the Digital Sign) to display relevant and related content. Similarly, as the product moves away from the board the Wireless Activation Module directs and controls the Activation Target device to a more general content.

In another embodiment of the present invention, the Activation Monitoring Module can be configured to interact with multiple Beacons at the same time. For instance, if a customer approaches towards an antenna (an antenna installed on a digital sign) carrying multiple products e.g. two pairs of jeans, the Wireless Activation Module has a sub module that can control and activate content on target-activation devices to play two promotional videos simultaneously. The Monitoring Module can be configured to store monitoring information to an external repository and transmit all or part of the monitoring information to one or more external sources via an API call a Web Service, an E-mail, a Tweet, a Facebook post, etc.

The Multi-Dimensional Content Module, wherein the Beacon activity monitored by Wireless Activation Module is used to activate and direct Multi Dimensional Content to one or more Activation Target Devices and/or pass that responsibility onto an external resource where the external resource can then direct and control multi-dimensional content on one or more activation-target devices.

In an embodiment, the Direction Module is programmed to activate and direct Multi Dimensional Content to Activation Target Devices in response to Beacon activity. The Wireless Activation Module utilises its stored data and its configuration data, including the Beacon configuration data and other factors such as, external events, current state of multi-dimensional content and date-time to determine what to activate when Beacons cross their gain thresholds i.e. Beacons are active or vice versa, when the Beacons are inactive. The Wireless Activation Module can be programmed to handle scenarios, wherein multiple Beacons are active, one Beacon may have precedence over another and therefore its activities are given precedence. Similarly, inactive Beacons with the same precedence levels may trigger the Wireless Activation Module to perform related activities rather than Beacon specific activities. The Wireless Activation Module can be programmed to handle scenarios, wherein an active Beacon may trigger activities in one or more Activation Target Devices.

In another embodiment of the present invention, the Communication Module is configured to offload activation and direction of the Multi Dimensional Content to one or more external processes. Wireless Activation Module is also configured to communicate the Beacon data to one or more external processes. The external processes then direct the Multi Dimensional Content to Activation Target Devices. As per monitoring, the Wireless Activation Module can communicate with external resources in a multitude of ways including but not limited to sending the Beacon data through an API call, a Web Service and saving data to data repository. In another embodiment of the present invention, activation Design Module which is configured to implement design of the whole system. It further comprises a Metadata and an Implementation Module.

In another embodiment embodiment, the Metadata Module is operatively coupled with the Wireless Activation Module and can be defined by a machine readable language. In another embodiment, it defines a number of items including but not limited to the look and feel (if applicable) of the Wireless Activation Module, how the Wireless Activation Module interacts with the outside world e.g. external file locations, ftp sites, web service information, API details etc, external processes, how the Wireless Activation Module manages internal processing e.g. logging requirements, error handling etc, the configuration of the Beacons.

According to another embodiment of the present invention, the Implementation Module is configured to implement the Wireless Activation Module in software, firmware, and device. In an embodiment; it implements the base functional requirement, wherein it manages information including a record of beacon strengths and location. This allows to accurately determining whether the direction of the Beacon is travelling in relation to the antenna.

According to yet another embodiment, the Implementation Module can be run in three modes i.e. Standalone Mode, Offload Mode or both. The Standalone Mode can be configured to direct the content on the Activation Target Devices based on Beacon movement (history of location) and its configuration data. The Offload Mode is further configured to transmit Beacon data to one or more external resources. The external resources are then responsible for directing and controlling the Multi Dimensional Content on the Activation Target Devices.

FIG. 4A illustrates a tabular representation of one or more attributes configured to be used in the Metadata Module. FIG. 4B illustrates a tabular representation of the machine readable language. The machine readable language can be selected but not limited to XML, HTML, PHP, .NET, JAVA, etc.

Figure 5:
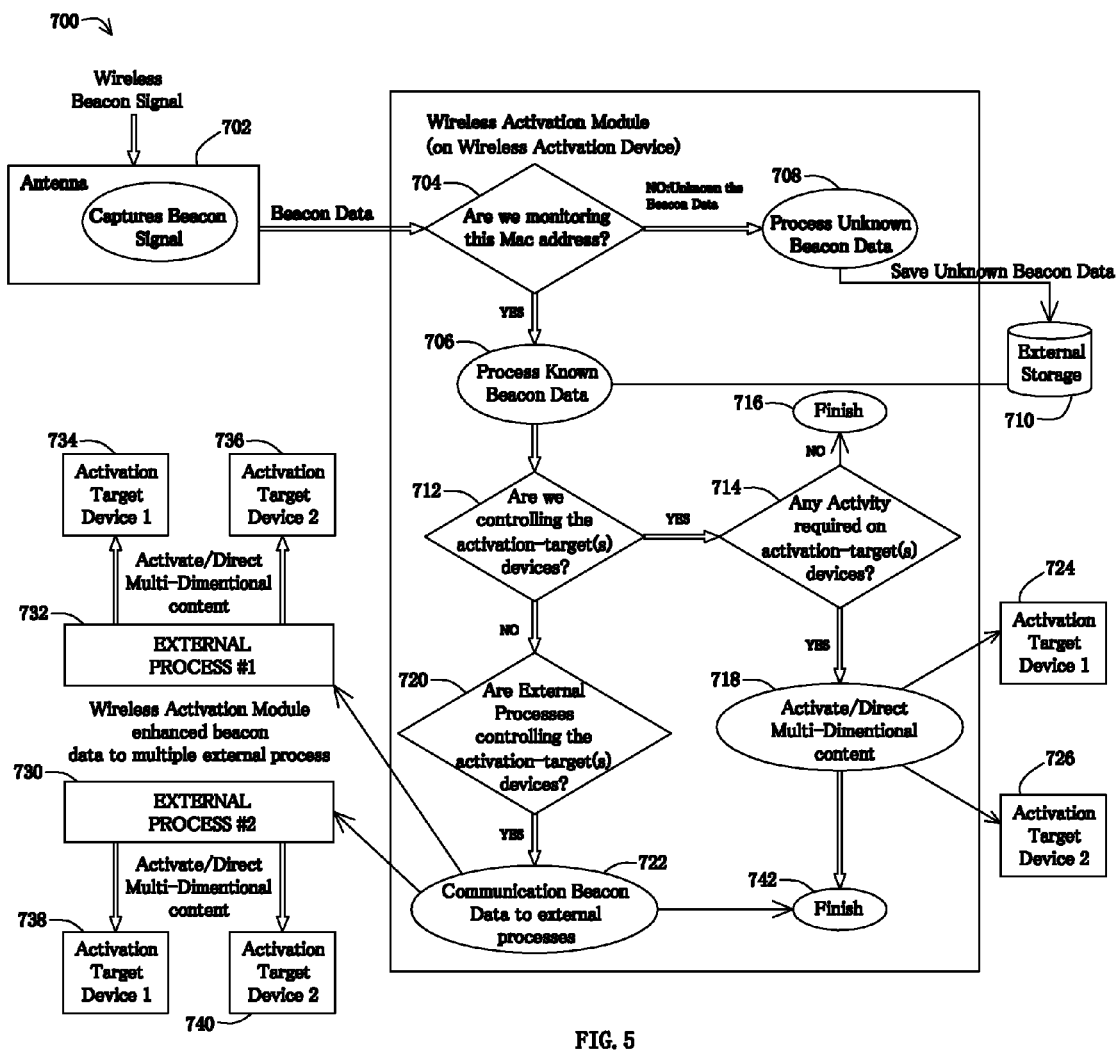
FIG. 5 illustrates a flow diagram of the proposed invention in accordance with an embodiment of the present invention.

FIG. 5 illustrates a flow diagram to show, how the whole environment works. Various modifications of these embodiments will readily apparent to those skilled in the art in view of present disclosure, and generic method defined herein may be applied to other embodiments.

An embodiment of the present invention provides a method for Wireless Communication and management comprises: Wireless Activation Module installed on a Wireless Activation Device configured to operatively communicate with one or more Antennas to receive one or more information from a Wireless Transceiver Product; capturing signals from multiple wireless beacons via antenna; detecting, monitoring and tracking beacons activities; translating beacons activities into signals that can be used to activate and target multi-dimensional content in response to beacon activities and other factors, such as Wireless Activation module configuration, events, date-time and current state of multi-dimensional content; and displaying or presenting specific information related to products or services within proximity of an Activation Target Device, wherein Wireless Transceiver Product(s) comprises a Wireless Transceiver configured to transmit or broadcast one or more information or signal and Wireless Activation module is configured to monitor, store and communicate information pertaining to both recognised and unrecognised wireless beacons; manage multi-dimensional content on multiple activation-target devices.

In an embodiment of the present invention, the Wireless Activation Module can control the Multi-Dimensional Content on all the Activation Target Devices or can pass information to one or more External Resource(s) and control the Multi-Dimensional Content on all the Activation Target Devices or can control the Multi-Dimensional Content on some of the Activation Target Devices and pass information to one or more External Resource(s) and control the Multi-Dimensional Content on some Activation Target Devices.

The Wireless Activation Module may simply communicate information i.e. beacon activity, proximity, gain thresholds to one or more external resource(s) using but not limited to an API call, a Web Service, saving data to a database etc. The external resource can then direct and control multi-dimensional content on one or more Activation-Target devices. For example, suppose beacons are embedded in products around the store and as the products are being moved around the store, the Wireless Activation Module is directing multi-dimensional content on a digital sign. As a customer brings a pair of shoes within the gain threshold the Wireless Activation module causes specific content to be displayed on a digital sign. However, the Wireless Activation module is also configured to pass its information to a Competition Adjudicator Process (external resource) and also a Theft Control Process (external resource). If the information is being passed to the Competition Adjudicator Process (external resource) results in a customer winning a prize the process plays loud music and flashing lights. If the information being passed to the Theft Control Process (external resource) indicates that a product being carried by a customer is leaving a specific area then a message/SMS is sent to the in-house security team and security cameras are activated in a specific area.

For another example is a customer in a theme park, upon entry the customer is given a beacon, as they walk around from one ride to another, this activity is passed from the Wireless Activation Module to an external resource/system called Customer Experience Planner (CEP). CEP controls the content being displayed on the digital signs in the theme park. Therefore, when a customer approaches a digital sign the CEP knows what rides that customer has been on and can suggest new rides and give directions to those rides. CEP also has access to queuing information at each ride and as such is also able to display queuing information to the customers. CEP is able to prompt the user to skip ride X because the queue is too long and suggest that the user can go to ride Y instead.

All structural and functional equivalents to the elements of the various embodiments of the invention described throughout the disclosure that are known or later come to be known to those ordinary skills in the art are expressly incorporated herein by reference and intended to be encompassed by the invention.

The above description and drawings are only illustrative of preferred embodiments which achieve the objects, features and advantages of the present invention, and it is not intended that present invention be limited thereto. Any modification of the present invention which comes within the spirit and scope of following claims is considered part of the present invention. Furthermore, to extent that the term "include", "have" or "like" is used in the description or the claims, such term is intended to be inclusive in manner similar to the term "comprise" is interpreted when employed as a transitional word in claim.

What is claimed is:

1. A method for Wireless Communication and management comprising steps of:
    providing Wireless Activation Module installed on a Wireless Activation Device configured to operatively communicate with one or more Antennas to receive one or more information from a Wireless Transceiver Product,
    capturing signals from multiple wireless beacons via antenna;
    detecting, monitoring and tracking beacons activities;
    translating beacons activities into signals that can be used to activate and target multi-dimensional content in response to beacon activities and other factors, such as module configuration, events, current state of multi-dimensional content and date or time;
    and displaying or presenting specific information related to products or services within proximity of an Activation Target Device.

2. The method of claim 1, wherein the Wireless Activation Module comprises a Multi-Dimensional Content Module configured to direct one or more Multi-Dimensional Content to Activation Target Device.

3. The method of claim 1, wherein the Wireless Transceiver Product comprises a Wireless Transceiver configured to transmit or broadcast one or more information or signal.

4. The method of claim 1, wherein the Wireless Activation module is configured to monitor, store and communicate information pertaining to both recognised and unrecognised wireless Beacons; and manage multi-dimensional content on multiple Activation-Target Devices.

5. The method of claim 1, wherein the Wireless Activation Module is programmed to direct and control beacons information by recognising, maintaining a count of active beacons and storing information including a record of previous beacon strengths and history of location.

6. The method of claim 1, wherein the Wireless Activation Module tracks information of beacon activity and stores in a data repository for reporting and data analysis.

* * * * *